US 9,483,863 B2

(12) United States Patent
Clar et al.

(10) Patent No.: US 9,483,863 B2
(45) Date of Patent: Nov. 1, 2016

(54) TERRAIN MAPPING SYSTEM USING MOVED MATERIAL ESTIMATION

(71) Applicant: Caterpillar Inc., Peoria, IL (US)

(72) Inventors: Jean-Jacques Clar, Edelstein, IL (US); Michael Allen Taylor, Swissvale, PA (US); Robert Jason McGee, Peoria, IL (US); Kyle Adam Edwards, Gillette, WY (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 14/562,118

(22) Filed: Dec. 5, 2014

(65) Prior Publication Data

US 2016/0163088 A1    Jun. 9, 2016

(51) Int. Cl.
*G06T 15/04*      (2011.01)
*G06T 15/10*      (2011.01)

(52) U.S. Cl.
CPC .............. *G06T 15/04* (2013.01); *G06T 15/10* (2013.01); *G06T 2215/12* (2013.01); *G06T 2215/16* (2013.01)

(58) Field of Classification Search
CPC ... G06T 15/04; G06T 15/10; G06T 2215/16; G06T 2215/12
USPC .......................................................... 701/23
See application file for complete search history.

(56) References Cited

U.S. PATENT DOCUMENTS

| | | | |
|---|---|---|---|
| 5,933,346 A * | 8/1999 | Brabec ..................... | E02F 3/437 340/684 |
| 6,085,583 A * | 7/2000 | Cannon .................... | E02F 3/435 37/413 |
| 6,108,949 A | 8/2000 | Singh et al. | |
| 7,313,506 B2 | 12/2007 | Kacyra et al. | |
| 7,822,266 B2 | 10/2010 | Wellington et al. | |
| 8,156,048 B2 | 4/2012 | Mintah et al. | |
| 8,351,684 B2 | 1/2013 | Clar et al. | |
| 8,364,405 B2 | 1/2013 | Sprock et al. | |
| 2009/0177337 A1 | 7/2009 | Yuet et al. | |
| 2011/0106384 A1* | 5/2011 | Corke ....................... | E02F 3/48 701/50 |
| 2012/0253609 A1 | 10/2012 | Li et al. | |
| 2014/0012404 A1 | 1/2014 | Taylor et al. | |
| 2014/0107897 A1 | 4/2014 | Zhu et al. | |

\* cited by examiner

*Primary Examiner* — Richard Camby
(74) *Attorney, Agent, or Firm* — Finnegan, Henderson, Farabow, Garrett & Dunner, LLP

(57) ABSTRACT

A terrain mapping system is disclosed for use with an excavation machine at a worksite. The terrain mapping system may have a locating device mountable onboard the excavation machine and configured to generate a first signal indicative of a position of the excavation machine at the worksite, and a sensor configured to generate a second signal indicative of a load on the excavation machine. The terrain mapping system may also have a controller in communication with the locating device and the sensor. The controller may be configured to update a surface contour of the worksite contained in an electronic map based on the first signal as the excavation machine traverses the worksite, and to determine an amount of material moved by the excavation machine based on the second signal. The controller may also be configured to generate a representation of the material moved by the excavation machine in the electronic map when the excavation machine ceases to move the material.

20 Claims, 2 Drawing Sheets

US 9,483,863 B2

TERRAIN MAPPING SYSTEM USING MOVED MATERIAL ESTIMATION

TECHNICAL FIELD

The present disclosure relates generally to a terrain mapping system and, more particularly, to a terrain mapping system using a moved material estimation.

BACKGROUND

Terrain at a worksite commonly undergoes geographic alteration by machines through, for example, digging, dozing, grading, leveling, or other excavation processes. In some applications, it may be beneficial to map the terrain as it changes. For instance, it may be advantageous to map the terrain for use in planning future excavation work at the worksite, or for determining productivity and/or profitability of the machines. Having an accurate and complete terrain map may also assist an operator in controlling the machine or, in some applications, facilitate autonomous or semi-autonomous control of the machines in navigating through the worksite.

One system for mapping terrain is described in U.S. Patent Application Publication No. 2014/0012404 (the '404 publication) of Taylor et al. that published on Jan. 9, 2014. The '404 publication describes a system for machine cut planning. The system creates a three-dimensional map of a worksite by tracking the movement of a machine as it travels over the worksite. Based on the map and known parameters of the machine, the system then plans an excavation path within a dozing slot for the machine. As the machine completes the excavation path, the map is updated (based on tracked movements of the machine) to reflect changes made to a surface contour of the slot.

Although the system of the '404 publication may map worksite terrain adequately for some slot dozing applications, it may lack the precision necessary for other applications. In particular, the system may not track the material moved by the machine out of the slot if the machine does not traverse over the material after it is moved. In other words, this material, once moved out of the slot, may disappear from the electronic map. If unaccounted for, this unmapped material could be problematic for future path planning and autonomous, semi-autonomous, or remote machine control.

The disclosed system is directed to overcoming one or more of the problems set forth above and/or other problems of the prior art.

SUMMARY

In one aspect, the present disclosure is directed to a terrain mapping system for use with an excavation machine at a worksite. The terrain mapping system may include a locating device mountable onboard the excavation machine and configured to generate a first signal indicative of a position of the excavation machine at the worksite, and a sensor configured to generate a second signal indicative of a load on the excavation machine. The terrain mapping system may also include a controller in communication with the locating device and the sensor. The controller may be configured to update a surface contour of the worksite contained in an electronic map based on the first signal as the excavation machine traverses the worksite, and to determine an amount of material moved by the excavation machine based on the second signal. The controller may also be configured to generate a representation of the material moved by the excavation machine in the electronic map when the excavation machine ceases to move the material.

In another aspect, the present disclosure is directed to another terrain mapping system for use with an excavation machine at a worksite. This terrain mapping system may include a locating device mountable onboard the excavation machine and configured to generate a first signal indicative of a position of the excavation machine at the worksite, and a sensor configured to generate a second signal indicative of a load on the excavation machine. The terrain mapping system may also include a controller in communication with the locating device and the sensor. The controller may be configured to update a surface contour of the worksite contained in an electronic map based on the first signal as the excavation machine traverses the worksite, and to determine an amount of material moved by the excavation machine based on the second signal. The controller may also be configured to receive input regarding a characteristic of the material moved by the excavation machine, and to determine when the excavation machine ceases to move the material based on at least one of a change in the load and a change in travel direction of the excavation machine. The controller may be further configured to generate a representation of the material moved by the excavation machine in the electronic map based on the characteristic when the excavation machine ceases to move the material.

In yet another aspect, the present disclosure is directed to a method for mapping terrain at a worksite. The method may include tracking movement of an excavation machine at the worksite, and updating a surface contour of the worksite contained in an electronic map based on the movement of the excavation machine. The method may also include sensing a load on the excavation machine, and determining an amount of material moved by the excavation machine based on the load. The method may further include generating a representation of the material moved by the excavation machine in the electronic map when the excavation machine ceases to move the material.

DETAILED DESCRIPTION

Figure 1:
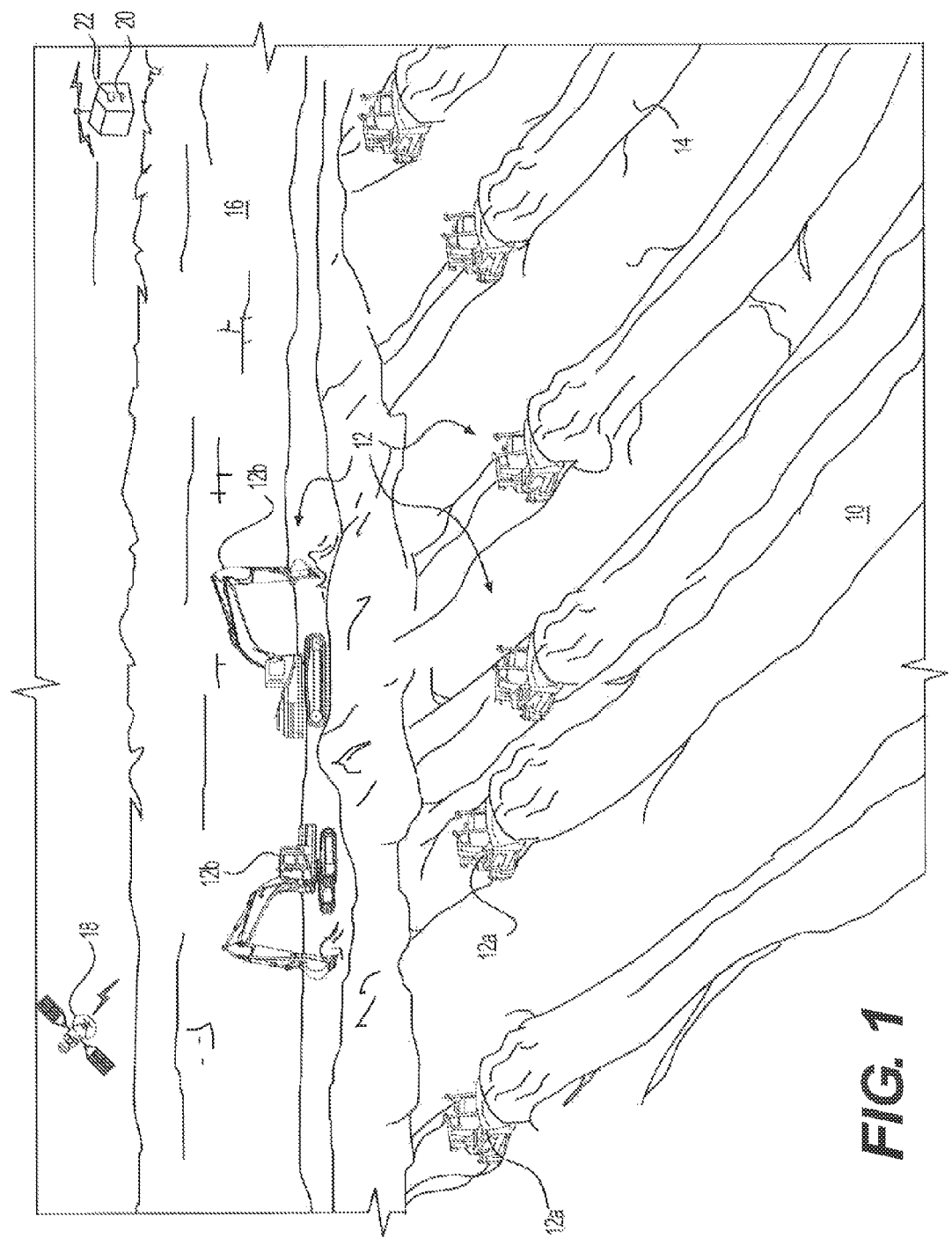
FIG. 1 is a pictorial illustration of an exemplary disclosed worksite.

FIG. 1 illustrates a worksite 10 and exemplary excavation machines 12 performing tasks at worksite 10. Worksite 10 may include, for example, a mine site, a landfill, a quarry, a construction site, or any other type of worksite having terrain traversable by machines 12. The tasks being performed by machines 12 may be associated with altering the geography at worksite 10, and may include a dozing operation, a bailing operation, a hauling operation, a grading operation, a leveling operation, a plowing operation, or any other type of operation. As machines 12 operate at worksite 10, the shapes, dimensions, and general surface contours of the terrain may change.

Two exemplary types of machines 12 are illustrated in FIG. 1, including a track-type dozer ("dozer") 12a and a hydraulic excavator ("excavator") 12b. In the depicted example, dozer 12a is shown as performing a slot dozing operation, in which dozer 12a moves back-and-forth within a slot 14 in front of an earthen wall 16 to push material away from wall 16. In this same example, excavator 12b is shown as moving material away from a base of wall 16 into multiple different slots 14, so that associated dozers 12a can push the material towards opposing ends of slots 14. The terrain at wall 16 may make it difficult for dozers 12a to move all of the material away from the base of wall 16 without the help of excavators 12b.

In some embodiments, machines 12 are manned machines. In other embodiments, some or all of machines 12 are remotely controlled, autonomously controlled, or semi-autonomously controlled. Regardless of how machines 12 are controlled, control of machines 12 may be enhanced via reference to an electronic map of worksite 10. This map may depict the changing surface contours of worksite 10, as well as the current locations of machines 12. Other information may also be represented within the map, if desired. As machines 12 move about worksite 10, a satellite 18 or other tracking device may communicate with a central controller 20 at a service facility 22 to monitor the movements of machines 12 and the changes made to the surface contours of worksite 10 by machines 12. Central controller 20 may then manage and update the electronic map of worksite 10 based on these movements and changes.

Central controller 20 may include means for monitoring, recording, storing, indexing, processing, communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
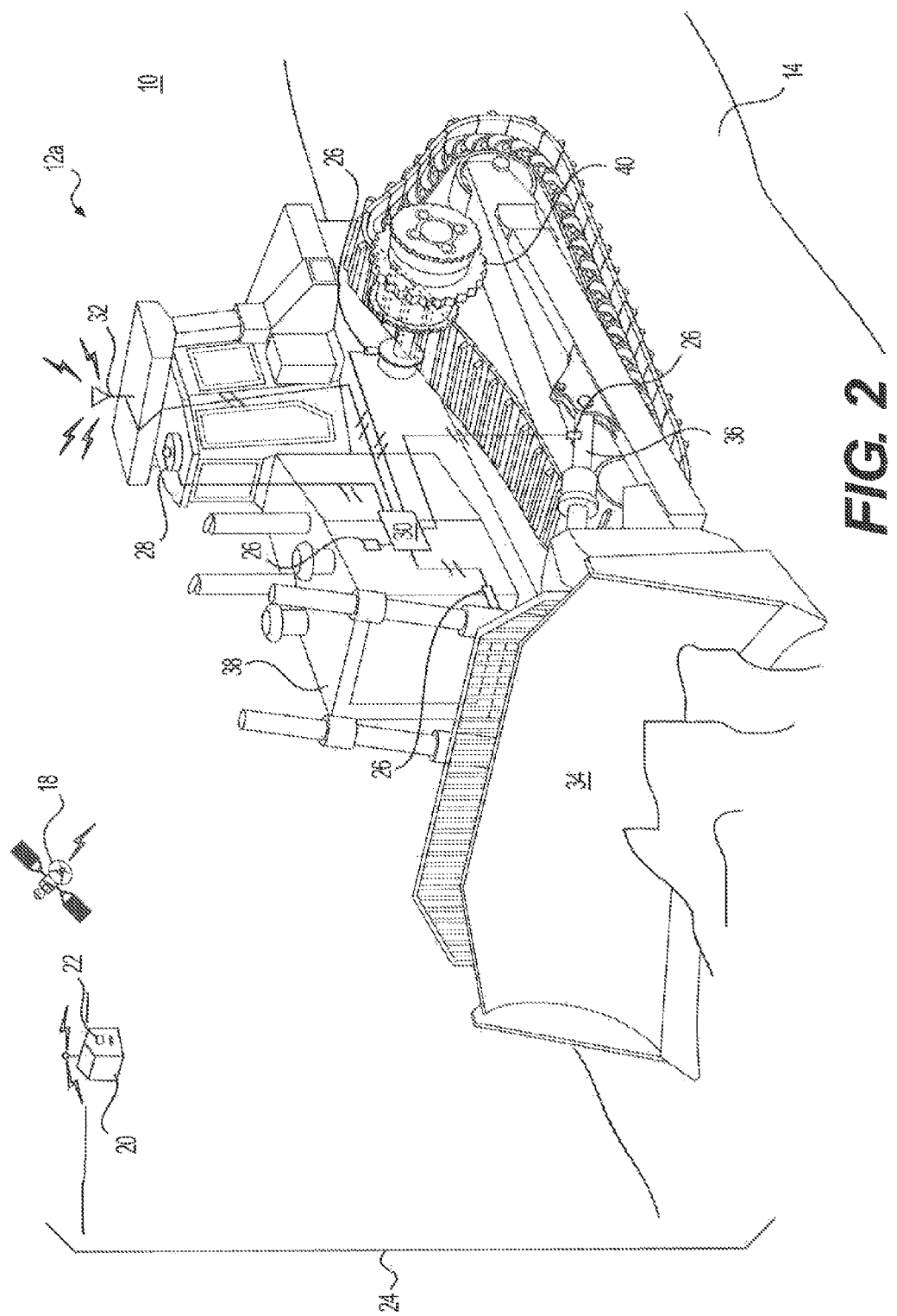
FIG. 2 is a diagrammatic illustration of an exemplary disclosed terrain mapping system that may be used at the worksite of FIG. 1.

As shown in FIG. 2, central controller 20 may form a portion of a system 24 that is configured to map the terrain at worksite 10 ("terrain mapping system 24"). In addition to controller 20 at service facility 22, terrain mapping system 24 may also include at least one sensor 26 and a locating device 28 mounted onboard each machine 12. Central controller 20 may be in communication with each of these other components (e.g., via an onboard machine controller 30 and/or a transmitter 32) and configured to determine, based on signals from these components and based on other known information stored in memory, the location of each machine 12, the surface contour of worksite 10 under each machine 12, and characteristics of material being moved by each machine 12. Controller 20 may then be configured to determine when a particular machine 12 has ceased moving the material, and how the moved material should be represented in the electronic map.

One or more of sensors 26 may be configured to monitor parameters indicative of an amount of material being moved by machine 12 (e.g., moved by a work tool 34 of machine 12) and to generate corresponding signals indicative thereof. Each of these sensors 26 may be any type of device known in the art for detecting and/or quantifying the amount of material. For example, sensors 26 may embody any one or more of a load cell, a force gauge, a pressure sensor, or another type of load detector associated directly with work tool 34 or associated with an actuator 36 that is connected to move work tool 34. The signals generated by sensor(s) 26 may correspond with strain on work tool 34 and/or with a force applied to work tool 34 by actuator 36. Alternatively, one or more sensors 26 may be associated with a power source 38 of machine 12 or a drivetrain 40 and configured to generate signals indicative of an amount of power used to push machine 12 against the material. Other types of sensors 26 (e.g., cameras, IR sensors, RADAR sensors, LIDAR sensors, etc.) may also be utilized to determine the amount of material moved by machine 12.

In addition to determining how much material is being moved by machine 12, sensors 26 may also be configured to determine how the material is being moved. In particular, one or more of sensors 26 may be configured to track movement of work tool 34, for example a position of work tool 34 relative to machine 12, a velocity of work tool 34, an acceleration of work tool 34, etc. This movement may be tracked directly via position transmitters mounted to work tool 34, or indirectly via extension sensors associated with actuators 36. Other ways to track this movement may also be possible. The signals generated by sensors 26 may be directed to controller 20 (e.g., via controller 30 and transmitter 32) for further processing.

Locating device 28 may be configured to generate a signal indicative of a geographical position and orientation of machine 12 relative to a local reference point, a coordinate system associated with worksite 10, a coordinate system associated with Earth, or any other type of 2-D or 3-D coordinate system. For example, locating device 28 may embody an electronic receiver configured to communicate with one or more satellites, or a local radio or laser transmitting system used to determine a relative geographical location of itself. Locating device 28 may receive and analyze high-frequency, low-power radio or laser signals from multiple locations to triangulate a relative 3-D geographical position and orientation. In some embodiments, locating device 28 may also configured to determine an acceleration and/or travel speed of machine 12. Based on the signals generated by locating device 28 and based on known kinematics of machine 12, controller 20 may be able to determine in real time the position, heading, travel speed, acceleration, and orientation of machine 12. This information may then be used by controller 20 to update the locations of machines 12 in the electronic map of worksite 10.

As is known in the art, the location and/or orientation information of machines 12 may also be used to determine the surface contours of worksite 10. In particular, as machines 12 move about worksite 10, the locations and orientations of machines 12 may be used, in conjunction with known kinematics of machines 12 (e.g., known distances and angles from a central reference point of machine 12 to ground engaging surfaces of machines 12), to calculate the contours of surfaces immediately below machines 12 (e.g., immediately below tracks of machines 12). This calculation may then be relied on to update the surface contours in the electronic map of worksite 10.

Onboard controller 30 may be configured to manage communications between other onboard components and central controller 20. For example, onboard controller 30 may receive signals from sensors 26 and locating device 28 and correlate the signals, filter the signals, buffer the signals, record the signals, or otherwise condition the signals before directing the signals offboard via transmitter 32. In some embodiments, onboard controller 30 may have additional functionality, for example autonomous or semi-autonomous control functionality over machines 12, if desired.

Transmitter 32 may be configured to facilitate communication between onboard controller 30 and central controller 20. Transmitter 32 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and central controller 20 may communicate directly with sensors 26 and/or locating device 28 via transmitter 32, if desired. Alternatively, each of sensors 26 and locating device 28 could include its own dedicated transmitter such that a common onboard transmitter is unnecessary.

Controller 20, based on the information received from onboard machines 12, may be configured to determine how the material moved by machines 12 should be represented in the electronic map once machines 12 cease moving the material. In particular, after a particular machine 12 ceases to move material, the material may be left in a pile at that location. Accordingly, controller 20 may determine when each machine 12 ceases to move the material, quantify how much material was being moved by each machine, and estimate a size and a shape of the resulting pile. The size and shape of the material pile may then be represented in the electronic map of worksite 10 at the location where the associated machine 12 was determined to have stopped moving the material.

Controller 20 may determine that a particular machine 12 has ceased to move material in a number of different ways. For example, a sudden change in direction (e.g., from a forward dozing direction to a backup direction) may indicate that machine 12 is no longer pushing material. In another example, a sudden change in force on work tool 34 (e.g., a sudden drop in the strain or pressure of work tool 34) may indicate that work tool 34 has been emptied of material or that the material has been pushed over a dump edge. In yet another example, a location of machine 12 and/or of work tool 34 (e.g., an approach of machine 12 to a dump edge of a high wall or the movement of work tool 34 over a known dump location) may indicate that the material has been released from work tool 34. Other ways of determining when machines 12 stop moving the material may also be utilized.

Controller 20 may determine the size and shape of the material pile left by machine 12 based on multiple different factors. For example, the size and shape of the pile may be affected by an amount of material calculated to have been moved by machine 12, geometry of work tool 34 (e.g., as input received from an operator), a type of the material, a viscosity or density of the material, and/or a contour of the worksite surface at a particular location. The type and/or viscosity of the material may be known (e.g., via previous surveying and/or testing) or observed and input by an operator of machine 12. The contour of the worksite surface at the material deposition location may be found via reference to the electronic map. And based on these factors, controller 20 may utilize a lookup table stored in memory or a preprogrammed algorithm to estimate a slump of the material and a corresponding size and shape of the material pile.

In some embodiments, controller may also consider how the material was deposited when determining the size and shape of the pile. For example, material dropped by excavator 12b from a higher elevation may spread out into a shallower pile, when compared to material pushed into a pile by dozer 12a without any elevation drop. Similarly, material pushed over a high wall by dozer 12a may spread out even more than material dropped into a pile by excavator 12b. In another example, material dropped from work tool 34 of excavator 12b during a swinging motion may be deposited in an arcuate pile, wherein material dropped from a stationary work tool 34 may be deposited in a more conical pile. Accordingly, a position, velocity, and acceleration of work tool 34 at the time of material release may have an effect on the shape of the resulting pile, and controller 20 may be programmed to account for this variability.

Controller 20 may also be configured to calibrate the pile estimation process using machines 12. For example, controller 20 may estimate a size and shape of a pile of material dropped by excavator 12b into a particular slot 14 at worksite 10. Controller 20 may then monitor movement of dozer 12a in the drop location both before and after the material drop, a difference in the surface contour measured from onboard dozer 12a then providing a comparison to the estimated pile shape and size. From this comparison, controller 20 may be able to make adjustments to the estimation process in order to improve its accuracy.

INDUSTRIAL APPLICABILITY

The disclosed system 24 may be applicable to any machine and worksite application where accurate terrain mapping is desirable. The disclosed system 24 may track movement of machines 12 and work tools 34 in a number of different ways, and update in real time an electronic terrain map used by machine 12. Specifically, system 24 may update the locations of machines 12, the surface contours of worksite 10 traversed by machines 12, and material moved by machines 12 but not traversed. By tracking the moved material, the terrain map accuracy and completeness may be enhanced.

With an accurate and complete electronic terrain map, the operators controlling machines 12 may be able to efficiently navigate worksite 10. In addition, autonomously controlled machines 12 may benefit from an accurate and complete electronic terrain map because, in some applications, contrary to an operator controlled machine, the autonomously controlled machines 12 may depend entirely on electronic terrain mapping to navigate through worksite 10. As a result, system 24 may facilitate operator control of machines 12 and/or autonomously or semi-autonomously control of machines 12 by enhancing the accuracy and completeness of the electronic terrain map.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A terrain mapping system for use with an excavation machine at a worksite, comprising:
    a locating device mountable onboard the excavation machine and configured to generate a first signal indicative of a position of the excavation machine at the worksite;
    a sensor configured to generate a second signal indicative of a load on the excavation machine; and
    a controller in communication with the locating device and the sensor, the controller being configured to:
        update a surface contour of the worksite contained in an electronic map based on the first signal as the excavation machine traverses the worksite;

determine an amount of material moved by the excavation machine based on the second signal; and
generate a representation of the material moved by the excavation machine in the electronic map when the excavation machine ceases to move the material.

2. The terrain mapping system of claim 1, wherein:
the controller is further configured to receive input regarding a characteristic of the material moved by the excavation machine; and
the controller is configured to generate the representation of the material based further on the characteristic.

3. The terrain mapping system of claim 2, wherein the representation includes a size and a shape of the material.

4. The terrain mapping system of claim 2, wherein the characteristic includes at least one of a type, a density, and a viscosity of the material.

5. The terrain mapping system of claim 2, wherein:
the controller is further configured to track movement of a work tool of the excavation machine; and
the representation is generated based on the movement of the work tool prior to when the excavation machine ceased moving the material.

6. The terrain mapping system of claim 5, wherein the movement includes at least one of an orientation, a location, an acceleration, and velocity of the work tool.

7. The terrain mapping system of claim 5, wherein:
the controller is configured to receive input regarding geometry of the work tool; and
the representation of the material is generated based also on the geometry.

8. The terrain mapping system of claim 1, wherein the representation of the material is generated based also on the surface contour of the worksite at a location corresponding to where the excavation machine ceased moving the material.

9. The terrain mapping system of claim 1, wherein the sensor includes a pressure sensor associated with a work tool actuator of the excavation machine.

10. The terrain mapping system of claim 1, wherein the controller is configured to determine when the excavation machine ceases to move the material based on a value change in the second signal.

11. The terrain mapping system of claim 1, wherein the controller is configured to determine when the excavation machine ceases to move the material based on a travel direction change of the excavation machine.

12. The terrain mapping system of claim 1, wherein the controller is configured to determine when the excavation machine ceases to move the material based on a location of the excavation machine.

13. The terrain mapping system of claim 1, wherein the controller is further configured to:
track movement of the excavation machine over the material after the excavation machine has ceased to move the material; and
selectively initiate a calibration process associated with representation of the material moved by the excavation machine based on the movement of the excavation machine over the material.

14. The terrain mapping system of claim 1, wherein:
the excavation machine is a first excavation machine; and
the controller is further configured to:
track movement of a second excavation machine over the material after the first excavation machine has ceased to move the material; and
selectively initiate a calibration process associated with representation of the material moved by the first excavation machine based on the movement of the second excavation machine over the material.

15. A terrain mapping system for use with an excavation machine at a worksite, comprising:
a locating device mountable onboard the excavation machine and configured to generate a first signal indicative of a position of the excavation machine at the worksite;
a sensor configured to generate a second signal indicative of a load on the excavation machine; and
a controller in communication with the locating device and the sensor, the controller being configured to:
update a surface contour of the worksite contained in an electronic map based on the first signal as the excavation machine traverses the worksite;
determine an amount of material moved by the excavation machine based on the second signal;
receive input regarding a characteristic of the material moved by the excavation machine;
determine when the excavation machine ceases to move the material based on at least one of a change in the load and a change in travel direction of the excavation machine; and
generate a representation of the material moved by the excavation machine in the electronic map based on the characteristic when the excavation machine ceases to move the material.

16. The terrain mapping system of claim 15, wherein the controller is further configured to:
track movement of the excavation machine over the material after the excavation machine has ceased to move the material; and
selectively initiate a calibration process associated with representation of the material moved by the excavation machine based on the movement of the excavation machine over the material.

17. The terrain mapping system of claim 15, wherein:
the excavation machine is a first excavation machine; and
the controller is further configured to:
track movement of a second excavation machine over the material after the first excavation machine has ceased to move the material; and
selectively initiate a calibration process associated with representation of the material moved by the first excavation machine based on the movement of the second excavation machine over the material.

18. A method for mapping terrain at a worksite, comprising:
tracking movement of an excavation machine at the worksite;
updating a surface contour of the worksite contained in an electronic map based on the movement of the excavation machine;
sensing a load on the excavation machine;
determining an amount of material moved by the excavation machine based on the load; and
generating a representation of the material moved by the excavation machine in the electronic map when the excavation machine ceases to move the material.

19. The method of claim 18, further including receiving input regarding a characteristic of the material moved by the excavation machine, wherein:
generating the representation of the material includes generating the representation of the material based further on the characteristic;
the representation includes a size and a shape of the material; and the characteristic includes at least one of a type, a density, and a viscosity of the material.

20. The method of claim 18, further including tracking movement of a work tool of the excavation machine, wherein generating the representation includes generating the representation based on the movement of the work tool prior to when the excavation machine ceased moving the material.

* * * * *